United States Patent [19]

Ikeda

[11] Patent Number: 5,475,847

[45] Date of Patent: Dec. 12, 1995

[54] POWER SAVING CONTROL SYSTEM FOR COMPUTER SYSTEM WITH FEATURE OF SELECTIVE INITIATION OF POWER SAVING CONTROL

[75] Inventor: Osamu Ikeda, Tokyo, Japan

[73] Assignee: Dia Semicon Systems Incorporated, Tokyo, Japan

[21] Appl. No.: 39,848

[22] Filed: Mar. 30, 1993

[30] Foreign Application Priority Data

Apr. 2, 1992 [JP] Japan ................................. 4-080806

[51] Int. Cl.$^6$ ................................................ G06F 1/04
[52] U.S. Cl. ........................ 395/750; 364/707; 364/143; 364/273.1; 364/948.8
[58] Field of Search ........................... 395/750, 550; 364/143, 707

[56] References Cited

U.S. PATENT DOCUMENTS

| | | | |
|---|---|---|---|
| 4,485,440 | 11/1984 | Duff et al. | 364/300 |
| 4,698,748 | 10/1987 | Juzswik et al. | 364/707 |
| 5,222,239 | 6/1993 | Rosch | 395/750 |
| 5,375,230 | 12/1994 | Fujimori | 395/575 |

Primary Examiner—Jack B. Harvey
Assistant Examiner—Paul R. Myers
Attorney, Agent, or Firm—Barnes & Thornburg

[57] ABSTRACT

A power saving control system for a computer system including a CPU, comprises a mode selecting circuit for selectively operating the CPU in a normal mode with relatively high performance and high power consumption and a power saving mode with relatively low performance and low power consumption, a first monitoring circuit for monitoring addresses accessed by the CPU over a first given period in order to detect a predetermined operational state of the CPU, in which only specific address group is repeatedly accessed, a second monitoring circuit for monitoring addresses accessed by the CPU over a second given period in order to detect a predetermined operational state of the CPU, in which only specific address group is repeatedly accessed, the second given period being independent of the first given period and much longer than the first given period, and a controller associated with the mode selecting circuit for normally operating the mode selecting circuit in the normal mode and responsive to one of the first and second monitoring circuit detecting the predetermined operational state, for operating the mode selecting circuit in the power saving mode as long as the predetermined operational state is maintained.

15 Claims, 4 Drawing Sheets

1

POWER SAVING CONTROL SYSTEM FOR COMPUTER SYSTEM WITH FEATURE OF SELECTIVE INITIATION OF POWER SAVING CONTROL

BACKGROUND OF THE INVENTION

1. Field of the Invention

The present invention relates to a power saving control system for a computer system. More specifically, the invention relates to a power saving control system particularly applicable for a battery-operated portable personal computer. Further particularly, the invention relates to a power saving control system which can selectively initiate power saving mode operation depending upon an address access repetition cycle.

2. Description of the Related Art

As disclosed in Japanese Unexamined Patent Publication (Kokai) No. 2-178818, for example, power saving control is well-known in the art to interrupt power supply to those sections of a computer system which are not executing any substantial task for reducing total power consumption of the computer system. Such technology has already been applied to field products. In the field of battery-operated personal computers including a lap-top computer, much study has been given in the power saving technology of this type for the sake of maximizing the system uptime with a smaller and lighter battery.

Conventionally, two types of functions for placing the personal computer into a stand-by state, i.e., a so-called rest mode function and a sleep mode function are provided in certain types of personal computer systems. The rest mode function is performed for automatically switching an operational clock frequency of the computer system from 16 Mhz in the normal operational mode to 1 Mhz when a CPU is held inoperative state for a predetermined period of time. If a further predetermined period elapses while the computer system is held in the rest mode state, the sleep mode is automatically initiated to shut down the power supply. In either mode of operation of the computer system, the normal mode operation can be resumed by operating an arbitrary key. In many cases, the predetermined period of time for initiating the stand-by mode can be arbitrarily set by the user through manual setting operation.

As can be appreciated, conventionally, the computer system is placed into the power saving state (i.e. the above-mentioned stand-by mode) in terms that the "the CPU is held in a substantially inoperative state for a predetermined period of time". In practice, the operational state of the computer system is changed over from the normal state into the power saving state in absence of any external factor for initiating any substantial task of the CPU, such as input through entry from a keyboard or from a communication supervisory system or so forth, for the predetermined period of time.

In general, the CPU is regarded as being in a substantial rest state when the above-mentioned factor to cause a substantial task is absent for the predetermined period of time. With the conventional technology, in which the foregoing substantial rest state of the CPU is detected to change over the operational mode into the power saving mode, however, such procedure may not achieve sufficient power saving because it requires to set the predetermined period of time more than several tens of seconds for a typical personal computer.

2

For instance, it is assumed that a word processing application is active in the personal computer. In this case, every entry through the keyboard serves as the factor for causing initiation of the task in the CPU. In response to each input signal, the CPU performs various tasks including very simple tasks, such as displaying a character on a display screen, slightly time-consuming tasks, such as conversion of Kana entry into Kanji character or moving of a document and time-consuming tasks, such as sorting of files or so forth. When an operator is drafting a document, he tends to have relatively long intervals between key entries for considering word, phrase or so forth. In such case, the possible interval between key entries over several tens of msec. to several sec. frequently occurs.

In this circumstance, if the predetermined period of time in the conventional power saving method is set in a range of 1 sec. to several sec., the power saving mode operation can be initiated during time-consuming tasks to cause failure of the on-going task. For avoiding such possibility, it becomes necessary to set the predetermined period in a range of several tens of sec. or several min. In the latter case, the power saving function is held inoperative during frequently occurring short intervals of key entry, in which the CPU is held substantially resting, so that satisfactory power saving effect cannot be achieved.

As a solution for this, it is possible to make the CPU per se declare a substantial rest state thereof to an external circuit (power saving circuit) every time the substantial rest state occurs. However, in such case, the function has to be included in all software to be executed by the CPU. It is difficult or even impossible to install such function in software which has already been completed.

On the other hand, if the computer system executes a single piece of software, it is possible to precisely detect the substantial rest state of the CPU by preliminarily analyzing the content of the software and detecting the state, in which a small loop is repeated, accessing only a specific address group. However, this approach probably is not practical when the computer system is active in a plurality of software.

SUMMARY OF THE INVENTION

Therefore, it is an object of the present invention to provide a power saving control system for a computer system, in which a type of loop program periodically and repeatedly executed is discriminated for selectively initiating a power saving depending upon the nature of the loop program.

According to one aspect of the invention, a power saving control system for a computer system including a CPU, comprises:

first means for selectively operating the CPU in a first mode with relatively high performance and high power consumption and a second mode with relatively low performance and low power consumption;

second means for monitoring addresses accessed by the CPU over a first given period in order to detect a predetermined operational state of the CPU, in which only a specific address group is repeatedly accessed;

third means for monitoring addresses accessed by the CPU over a second given period in order to detect a predetermined operational state of the CPU, in which only a specific address group is repeatedly accessed, the second given period being independent of the first given period and much longer than the first given period; and fourth means associated with the first means for normally operating the first means in the first mode and responsive to one of the second and third means detecting the predetermined operational state, for operating the first means in the second mode as long as the predetermined operational state is maintained.

In the preferred construction, each of the second and third means monitors addresses accessed by the CPU by periodically varying the given period. Practically, each of the second and third means may be operable in a learning mode in a given learning period which forms a former part of the given period, for recording addresses accessed by the CPU and a comparison mode in a given comparison period which forms a latter part of the given period, for comparing a currently accessed address with the addresses recorded during immediately preceding learning mode operation. In this case, each of the second and third means may update the given learning period at the end of the comparison mode operation and derive the given comparison period in relation to the updated learning period. Preferably, each of the second and third means varies the given learning period within a range defined by upper and lower limit values. Exemplarily, each of the second and third means initially sets the given learning period at the lower limit value and updates the learning period by adding a predetermined additional period unit to the instantaneous learning period at every end of the comparison mode operation.

In the preferred embodiment, the first means includes a first clock generator for generating a first higher frequency clock, a second clock generator for generating a second lower frequency clock, and a switching means for selectively supplying one of the first and second clocks to the CPU.

According to another aspect of the invention, a power saving control system for a computer system including a CPU, comprises:

an operational mode switching means for switching operational mode of the CPU between a normal mode, in which power consumption is relatively large, and a power saving mode, in which the power consumption is relatively small;

a first repeated access detecting means for monitoring address transition in address access of the CPU within a predetermined first period at a predetermined first address resolution and for detecting a repeated access state of the CPU, in which a specific address group is repeatedly accessed;

a second repeated access detecting means for monitoring address transition in address access of the CPU within a predetermined second period at a predetermined second address resolution and for detecting a repeated access state of the CPU, in which a specific address group is repeatedly accessed, the second period being much longer than the first period and set in non-overlapping manner to the first period; and a control means responsive to the first and second repeated access detecting means detecting the repeated access state while the CPU is in the normal mode for switching the operational mode of the CPU to the power saving mode.

Preferably, the first and second repeated access detecting means periodically varies the address resolution in monitoring address access transition.

It is further desirable that the power saving control system further comprises an inhibiting means for inhibiting operation of the control means for switching the operational mode from the normal mode to the power saving mode when the operational state of the CPU satisfies a predetermined inhibiting condition.

Practically, the inhibiting means may inhibit switching operation of the control means when the address of the software interruption vector for receiving keyboard entry is accessed within an immediately preceding predetermined period, when an address of the software interruption for checking the keyboard entry is not accessed in over a given period in the past, or when an address assigned as a video memory space is being accessed.

BRIEF DESCRIPTION OF THE DRAWINGS

The present invention will be understood more fully from the detailed description given herebelow and from the accompanying drawings of the preferred embodiment of the invention, which, however, should not be taken to be limitative to the present invention but are for explanation and understanding only.

FIGS. 3 and 4 shows sub-routines which are triggered in execution of the main routine of FIG. 2.

DESCRIPTION OF THE PREFERRED EMBODIMENT

Figure 1:
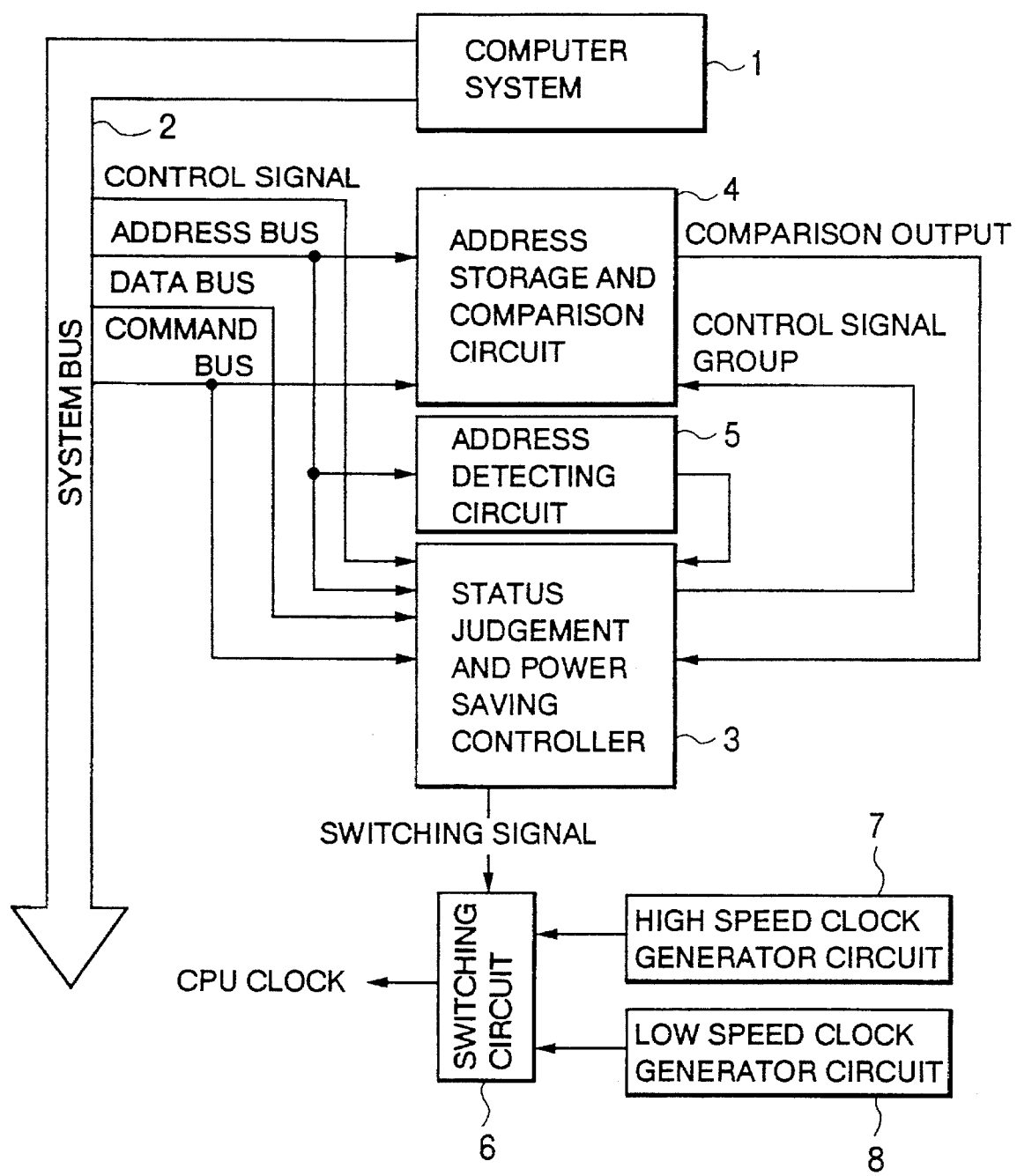
FIG. 1 is a schematic block diagram of the preferred embodiment of a power saving control system for a computer system according to the present invention.

Referring now to the drawings, particularly to FIG. 1, the preferred and exemplary embodiment of a power saving control system for a computer system is illustrated schematically. It should be noted that the general concept of power saving control and the general construction of a power saving control system relevant to the present invention has been disclosed in the commonly owned co-pending U.S. patent application Ser. No. 07/886,649, filed on May 20, 1992, which is, in turn, a Continuation-in-Part application of U.S. patent application Ser. No. 07/735,382, filed on Jul. 24, 1991, and a counterpart European Patent Application is also pending under Application No. 92906159.6, filed on Feb. 27, 1992. The disclosures of the above-identified related applications are herein incorporated by reference.

For the purpose of disclosure, the shown embodiment of the power saving control system is adapted for application to a so-called notebook-type personal computer having installed therein an Intel 80386SX CPU. However, it should be appreciated that the above-identified specific computer system is not intended to be specific for the present invention but can be of any types of computer systems.

Power consumption in operation of the computer system is variable by varying a frequency of a CPU clock to be applied to the CPU. In the shown embodiment, the CPU is operated in a normal mode (high speed mode) in which power consumption is relatively high, and a power saving mode (low speed mode) in which power consumption is relatively low by switching the CPU clock frequency. For providing different frequency of CPU clocks, the shown embodiment of the power saving control system includes a high speed clock generator circuit 7 which generates a high speed clock of a predetermined higher frequency, e.g., 50 MHz, and a low speed clock generator circuit 8 which generates a low speed clock of a predetermined lower frequency, e.g. 4 MHz. A switching circuit 6 is provided for selectively supplying one of the high speed clock and the low speed clock to the CPU of a computer system 1.

The shown embodiment of the power saving control system also includes a status judgement and power saving controller 3, an address storage and comparison circuit 4 and an address detecting circuit 5, which are connected to a system bus 2 of the computer system 1. These circuit components are adapted to perform monitoring of operation of the computer system and power saving control. The address storage and comparison circuit 4 is associated with the status judgement and power saving controller 3 so that it is selectively operated in an address storage mode and an address comparison mode depending upon a control signal from the latter. In the address storage mode, the content of storage is initially cleared and, subsequently, addresses accessed by the CPU of the computer system are stored with an appropriate address resolution. Namely, when the CPU accesses a certain address, "1" is set in a corresponding memory cell in the address storage and comparison circuit 4. A group of addresses stored in the address storage mode will be hereinafter referred to as "learnt address". In the address comparison mode operation of the address storage and comparison circuit 4, the address currently accessed by the CPU is compared with the learnt addresses in order. If the currently accessed address is other than the learnt addresses, an unmatching signal is output to the status judgement and power saving controller 3.

Further discussion will be given herebelow in terms of an application of the shown embodiment of the power saving control system according to the invention for the computer system 1, on which MS-DOS is active as an operating system. It should be noted that although the specific example will be discussed herebelow, the shown embodiment of the power saving control system according to the present invention is applicable for any computer systems which are active with various operating systems. In the exemplary application, in any MS-DOS application programs active in a real mode on an 80386SX CPU, an interruption vector table is assigned to specific address. For this interruption vector table, a software interruption function for obtaining input data in response to an entry through a keyboard and a software interruption function for checking if the entry through the keyboard is present or not, are provided. The address detecting circuit 5 in FIG. 1 is a circuit for individually detecting access of two software interruption vectors in the interruption vector table for generating an address detection signal. The address detection signal is utilized by the status judgement and power saving controller 3 in a manner set out below.

In addition, to the foregoing construction, an indicator circuit may be provided for indicating the CPU operation in the power saving mode. In such case, the switching signal for switching operation modes output from the status judgement circuit is also input to an indicator circuit. The indicator circuit is responsive to the switching signal to maintain a LED indicator OFF during the normal mode operation of the CPU and ON during the power saving mode operation of the CPU. The LED indicator may be arranged on a housing of the computer system together with a power indicator lamp, a RAM drive access indicator lamp, a hard disk access indicator lamp or so forth. The detail of the power saving control system incorporating the indicator circuit has been disclosed in the co-pending U.S. patent application for "Power Saving Control System for Computer System" commonly owned by the owner of the present invention. The disclosure of the above-identified commonly owned co-pending U.S. patent application is herein incorporated by reference.

As is well known, many pieces of software contain so-called software timers at various locations for various purposes. Typically, the software timer contains a loop program to repeatedly and periodically execute the identical process for a predetermined time. Naturally, while the loop program of the software timer is executed, a specific address group is accessed repeatedly. If such repeated address access state is regarded to satisfy the operational state of the CPU to initiate power saving mode operation, and the operational mode of the CPU is switched over to the power saving mode to lower the operation speed, a time measuring function of the software timer becomes impossible to achieve. Therefore, even though the specific address group is repeatedly accessed, the power saving mode should not be initiated while the software timer is executed.

On the other hand, some typical software contains a process called a dynamic stop, in which a tiny loop program is repeated in a substantially short repetition cycle period waiting for interruption. While the CPU executes the loop program for the dynamic stop, the status of the CPU can be regarded as a substantial rest state. Therefore, the power saving mode can be initiated without affecting to the function.

The loop program for the dynamic stop typically contains one or two instructions and has a substantially short repetition cycle period, e.g. less than or equal to 10 sec. On the other hand, the loop program for the software timer is typically comprises of three to five or six instructions. Typically, the repetition cycle period of the software timer is longer than 10 μsec. and less than or equal to 200 μsec. The specific periods identified here are just for explanation and not intended to specify the invention.

As can be clear from the above, by detecting the repetition cycle period, the loop programs for the dynamic stop and for the software timer can be successfully discriminated for selectively initiating the power saving mode operation while avoiding initiation of the power saving during execution of the software timer.

Figure 2:
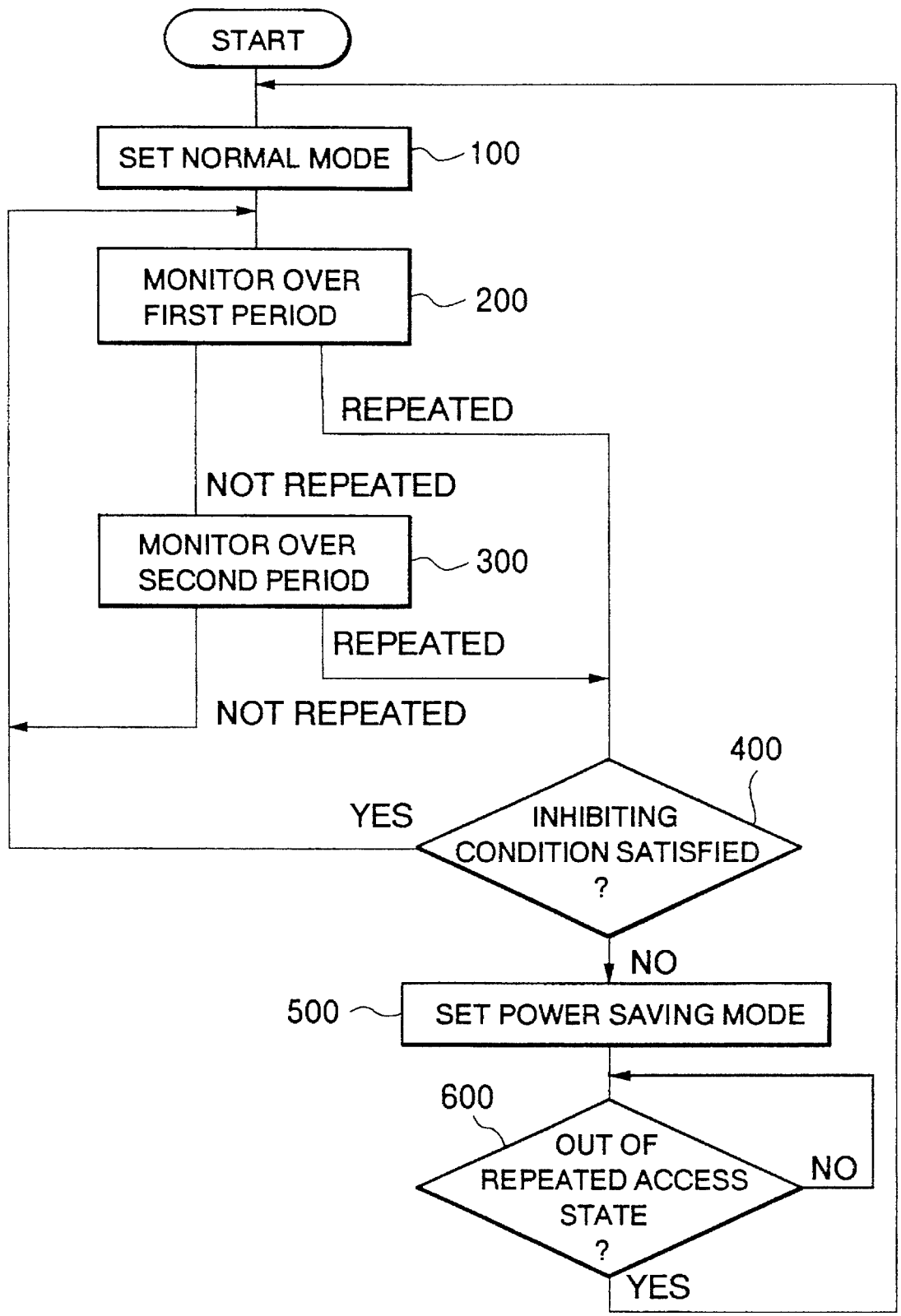
FIGS. 2, 3 and 4 are flowcharts showing a process of operation of a status judgement and power saving controller in the power saving control system of FIG. 1, in which FIG. 2 show a flow chart of a main routine.
Figure 3:
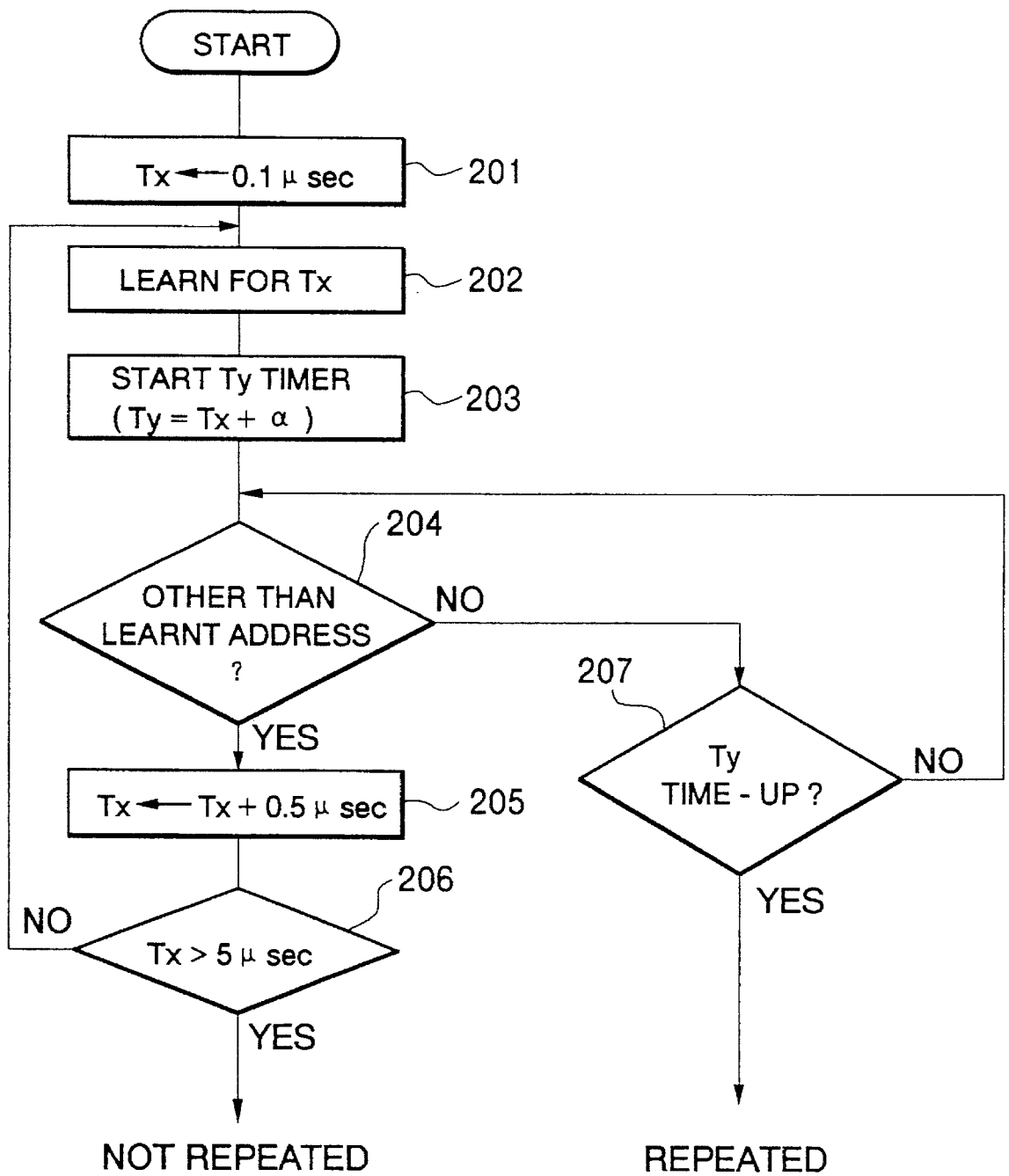
Figure 4:
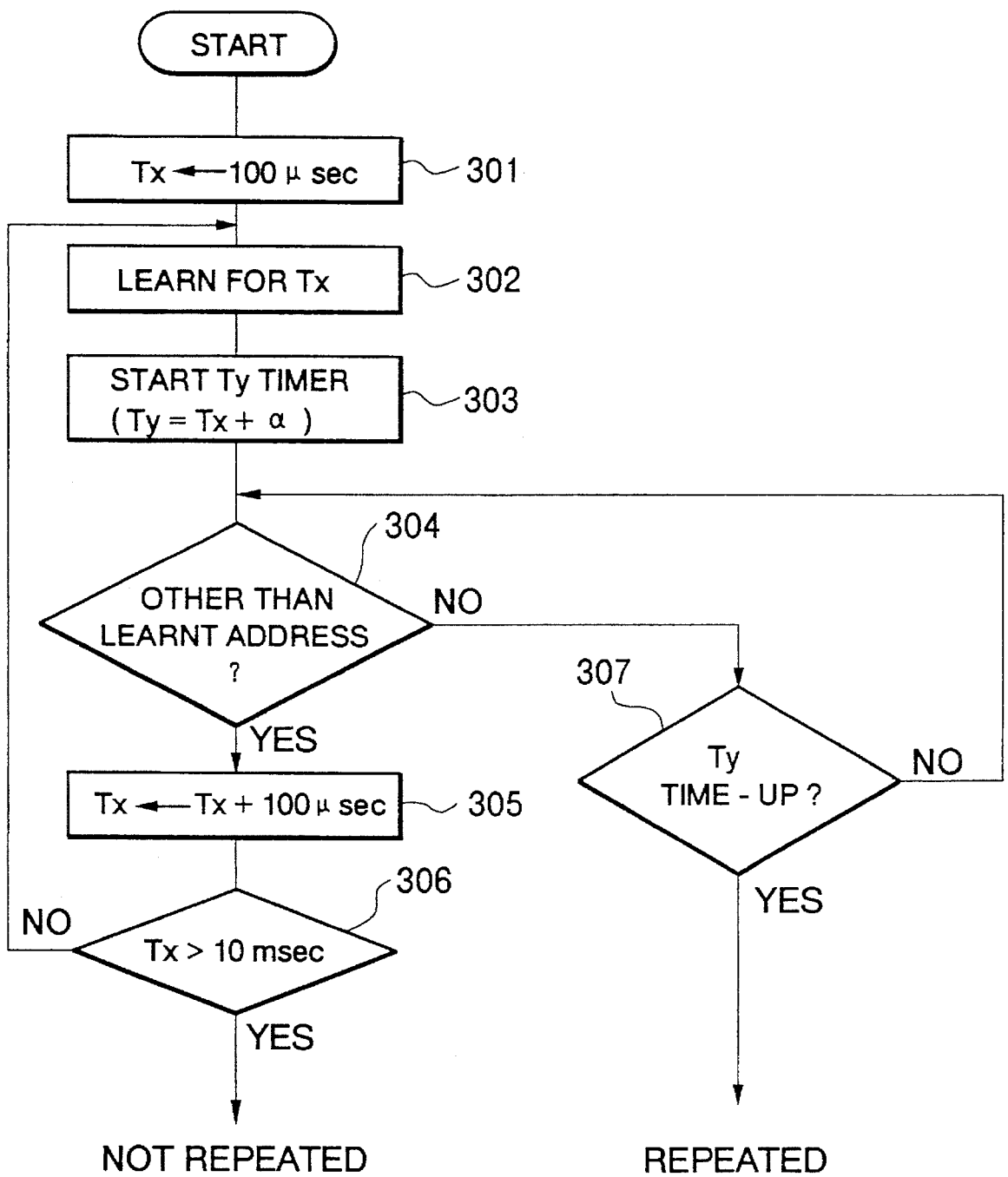

Processes of status monitoring and power saving control of the computer system 1 to be performed by the status judgement and power saving controller 3 are illustrated in flowcharts in FIGS. 2 to 4.

As shown in FIG. 2, at the initial step 100 the computer system 1 is set for the normal mode operation in which the high speed clock, e.g. 50 MHz clock, is supplied to the CPU for normal operation thereof. While the CPU 2 is in operation under normal mode with the high speed clock, address access transition over a first, shorter period (e.g. approximately 0.2 μsec. to 10 μsec.) is monitored for detecting the repeated access of the specific addresses in execution of the loop program for the dynamic stop consisting of one or two instructions, at a step 200. If the repeated access state is not detected, the process is advanced to a step 300, in which address access transition over a second, longer period (e.g. approximately 200 μsec. to 20 msec.) is monitored for detecting substantial rest state of the CPU other than the state in execution of the process for the dynamic stop and the software timer, by detecting a loop consisting of five or six to several tens of instructions. If the repeated access state is not detected at the step 300, the process is returned to the step 200.

As can be appreciated from the discussion given about, the first and second periods to be monitored are not overlapped. Since the loop program for the software timer typically consists of three to five or six instructions to be executed in a period out of the first and second periods, the software timer can be successfully avoided from detection of the repeated address access as an initiation condition of the power saving mode operation.

FIG. 3 shows a process of the step 200 in a form of a sub-routine. In FIG. 3, at a step 201, a learning period Tx is set at a lower limit value, e.g. 0.1 μsec. Subsequently, at a step 202 the address storage and comparison circuit 4 is cleared or reset. Thereafter, at the step 202, the address storage mode operation of the address storage and comparison circuit 4 is initiated for the learning period Tx. By this, address blocks accessed by CPU during the learning period Tx is stored in the address storage and comparison circuit 4 to establish the learnt address.

At a step 203, a timer is started to measure a monitoring period Ty which is set depending upon the learning period Tx but longer than the learning period Tx. During the monitoring period Ty, the address storage and comparison circuit 4 operates in the comparison mode. The address storage and comparison circuit 4 acting in the comparison mode checks whether the CPU accesses an address other than those in the learnt addresses during the monitoring period Ty measured by the timer (steps 204 and 207). If the address other than the learnt addresses is accessed within the monitoring period Ty, the process is advanced from the step 204 to a step 205. In the step 205, the learning period Tx is updated by adding 0.5 μsec. to the current value of the learning period Tx. Subsequently, at a step 206, check is performed if the Tx updated at the step 205 exceeds a predetermined upper limit value, e.g. 5 μsec. If the updated Tx period is smaller than the upper limit value, e.g. 5 μsec., the process is returned to the step 202 to re-start learning mode operation. On the other hand, if the updated Tx is greater than or equal to the upper limit value, judgement is made that repeated address access is not detected within the first period. If the state where no address other than a learnt address is accessed is detected through the steps 204 and 207, a positive answer is issued at the step 207.

As can be seen from FIG. 4, the process of the sub-routine to be executed in the step 300 is substantially the same as that in the step 200, except for the time parameters. Therefore, in FIG. 4, respective steps are represented by reference numbers greater by one hundred than the corresponding steps in FIG. 3. Namely, in the process of FIG. 4, the lower limit period to be set as the initial period of the learning period Tx at the step 301 is 100μ. Also, the period to be added to the learning period Tx at the step 305 is 100 μsec. Also, the upper limit period of the learning period Tx to be checked at the step 306 is set at 10 msec.

When the repeated access state, in which "no address other than the learnt addresses is accessed within the monitoring period Ty" is detected at either steps 200 or 300, the process is advanced to a step 400 to perform judgement as to whether the status of the computer system 1 is matched with the following inhibiting conditions. If the status of the computer system does not match with any of the inhibiting conditions, the process is advanced to a step 500. At the step 500, the switching circuit 6 is switched over so that the low speed clock, e.g. 4 MHz clock, from the low speed clock generator circuit 8 is supplied to the CPU to operate the latter in the power saving mode. Subsequently, at a step 600a, check is performed to determine if the CPU moves out of the repeated access state or not. If the CPU status out of the repeated access state is detected, the process returns to the initial step 100 so that the high speed clock, e.g. 50 MHz clock, from the high speed clock generator 7 is supplied to the CPU to operate the latter in the normal mode.

It should be noted that the inhibiting conditions to be set in the step 400 may be, for example, (1) when the address of the software interruption vector for receiving keyboard entry is accessed within an immediately preceding predetermined period, (2) when an address of the software interruption for checking the keyboard entry is not accessed in over a given period in the past, and (3) when an address assigned as a video memory space is being accessed.

On the other hand, at the step 600, moving out of the repeated access state is practically detected in the following manner. By operating the address storage and comparison circuit 4 in the comparison mode a, continuous check is performed to determine whether an address other than the learnt addresses is accessed. When an address other than the learnt address is accessed, judgement is made that the CPU moves out of the repeated access state. Also, even when no address other than the learnt address is accessed, judgement is made that the repeated access state is terminated when the address of the software interruption vector for reading in the keyboard entry is accessed.

As set forth above, the operational state where the CPU repeatedly accesses a certain group of addresses within given periods, avoiding the period in which the repeated address access by execution of the loop program for the software timer is potentially detected, is detected so that the CPU is operated in the power saving mode during the period that the repeated access state is continuously detected except for the case where the above-mentioned inhibiting conditions are established. By this, in the operating state of typical MS-DOS or its applications, the power saving period is frequently in a range of 10 msec. to several sec. to achieve substantial power saving without substantially lowering the processing performance of the computer system.

Although the invention has been illustrated and described with respect to an exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

For instance, while the foregoing embodiment employs a control system in which the clock frequency is differentiated between the normal mode and the power saving mode in order to reduce power consumption, various control systems, such as those lowering the power source voltage, intermittently operating the CPU at an appropriate interval or lowering the accessing rate of the CPU, can also be employed. These control systems may be selected depending upon application of the power saving control system.

Also, it is possible to control the operational mode of the CPU depending upon the temperature condition thereof for avoiding overheating. The temperature dependent control has been discussed in the co-pending U.S. patent application for "Drive Control System for Microprocessor" and commonly owned by the owner of the present invention. The disclosure of the above-identified commonly owned co pending U.S. patent application is herein incorporated by reference.

What is claimed is:

1. A power saving control system for a computer system including a CPU, comprising:

first means for selectively operating said CPU in a first mode with relatively high performance and high power consumption and a second mode with relatively low performance and low power consumption;

second means for monitoring addresses accessed by said CPU over a first given period in order to detect a predetermined operational state of said CPU, in which only a specific address group is repeatedly accessed, said first given period being varied periodically;

the second means also monitoring addresses accessed by said CPU over a second given period in order to detect a predetermined operational state of said CPU, in which only a specific address group is repeatedly accessed, said second given period being independent of said first given period and much longer than said first given period and being varied periodically; and third means associated with said first means for normally operating said first means in said first mode and responsive to said second means detecting said predetermined operational state, for operating said first means in said second mode as long as said predetermined operational state is maintained.

2. A power saving control system as claimed in claim 1, wherein said second means is operable in a learning mode in a given learning period which forms a former part of each of said first and second given periods for recording addresses accessed by said CPU and a comparison mode in a given comparison period which forms a latter part of each of said first and second given periods, for comparing a currently accessed address with the addresses recorded during immediately preceding learning mode operation period.

3. A power saving control system as claimed in claim 2, wherein said second means updates said learning mode operation period at the end of said comparison mode operation and derives said given comparison period in relation to said updated learning mode operation period.

4. A power saving control system as claimed in claim 3, wherein said second means varies said learning mode operation period within a range defined by upper and lower limit values.

5. A power saving control system as claimed in claim 4, wherein said second means initially sets said learning mode operation period at said lower limit value and updates said learning mode operation period by adding a predetermined additional period unit to the instantaneous learning period at the end of every said comparison mode operation.

6. A power saving control system as claimed in claim 1, wherein said second means varies said first given period within a first predetermined range defined by a first upper limit and a first lower limit and varies said second given period within a second predetermined range defined by a second upper limit and a second lower limit, said second lower limit being much greater than said first upper limit.

7. A power saving control system as claimed in claim 6, wherein a range defined between said first upper limit and said second lower limit corresponds to a predetermined specific operational state, in which only a specific address group in a loop program of a software timer is repeatedly accessed and initiation of the power saving mode is prohibited.

8. A power saving control system as claimed in claim 7, wherein said range substantially corresponds to a possible repetition cycle period of a loop for a software timer.

9. A power saving control system as claimed in claim 1, wherein said first means includes a first clock generator for generating a first higher frequency clock, a second clock generator for generating a second lower frequency clock, and a switching means for selectively supplying one of said first and second clocks to said CPU.

10. A power saving control system for a computer system including a CPU, comprising:

an operational mode switching means for switching operational mode of said CPU between a normal mode, in which power consumption is relatively large, and a power saving mode, in which the power consumption is relatively small;

a repeated access detecting means for monitoring address transition in address access of said CPU within a predetermined first period at a predetermined first address resolution and for detecting a repeated access state of said CPU, in which a specific address group is repeatedly accessed;

said repeated access detecting means also monitoring address transition in address access of said CPU within a predetermined second period at a predetermined second address resolution and detecting a repeated access state of said CPU, in which a specific address group is repeatedly accessed, said second period being much longer than said first period and set in non-overlapping manner to said first period; and a control means responsive to said repeated access detecting means detecting said repeated access state while said CPU is in said normal mode for switching the operational mode of said CPU to said power saving mode.

11. A power saving control system as claimed in claim 10, wherein each of said first and second repeated access detecting means periodically varies said address resolution in monitoring address access transition.

12. A power saving control system as claimed in claim 11, which further comprises an inhibiting means for inhibiting operation of said control means for switching the operational mode from said normal mode to said power saving mode when the operational state of said CPU satisfies a predetermined inhibiting condition.

13. A power saving control system as claimed in claim 12, wherein said inhibiting means inhibits switching operation of said control means when the address of the software interruption vector for receiving keyboard entry is accessed within an immediately preceding predetermined period.

14. A power saving control system as claimed in claim 12, wherein said inhibiting means inhibits switching operation of said control means when an address of the software interruption for checking the keyboard entry is not accessed within an immediately preceding predetermined period.

15. A power saving control system as claimed in claim 12, wherein said inhibiting means inhibits switching operation of said control means when an address assigned as a video memory space is being accessed.

\* \* \* \* \*